United States Patent [19]

Phanopoulos et al.

[11] Patent Number: 5,130,366

[45] Date of Patent: Jul. 14, 1992

[54] LIQUID DIPHENYL DIISOCYANATE PREPOLYMER/DIPHENYLMETHANE COMPOUND COMPOSITIONS

[75] Inventors: Chris Phanopoulos, Brussels, Belgium; Gian-Carlo Bagaglio, Varese, Italy

[73] Assignee: Imperial Chemical Industries PLC, Longon, England

[21] Appl. No.: 594,245

[22] Filed: Oct. 9, 1990

[30] Foreign Application Priority Data

Dec. 18, 1989 [GB] United Kingdom ............ 8928548

[51] Int. Cl.$^5$ .................................................. C08G 18/10
[52] U.S. Cl. ........................................ 524/589; 524/590; 524/871; 252/182.2; 252/182.22
[58] Field of Search .................. 252/182.2, 182.22; 524/589, 590, 871

[56] References Cited

U.S. PATENT DOCUMENTS

| | | | |
|---|---|---|---|
| 4,795,760 | 1/1989 | Lucke | 521/83 |
| 4,797,226 | 1/1989 | Hostettler | 252/182.2 |
| 4,871,792 | 10/1989 | Lucke | 524/59 |

FOREIGN PATENT DOCUMENTS

| | | |
|---|---|---|
| 0130090 | 1/1985 | European Pat. Off. . |
| 0170282 | 2/1986 | European Pat. Off. . |
| 0277331 | 8/1988 | European Pat. Off. . |
| 3710243 | 10/1988 | Fed. Rep. of Germany . |
| 793780 | 4/1958 | United Kingdom . |

*Primary Examiner*—Maurice J. Welsh
*Assistant Examiner*—Rachel Johnson

[57] ABSTRACT

A bitumen-free liquid prepolymer composition comprising:
  a) from 50 to 99% by weight of an isocyanate-containing prepolymer obtained by the reaction of a stoichiometric excess of diphenylmethane diisocyanate with an organic compound containing a plurality of isocyanate-reactive groups, and
  b) from 50 to 1% by weight of a substituted diphenylmethane compound which is free from ester groups, isocyanate groups and isocyanate-reactive groups and has a melting point below 25° C., a boiling point above 150° C. and a fire point above 100° C.

The composition has a good stability and is useful for preparing elastomers and foams.

8 Claims, No Drawings

LIQUID DIPHENYL DIISOCYANATE PREPOLYMER/DIPHENYLMETHANE COMPOUND COMPOSITIONS

This invention relates to liquid prepolymer compositions and more particularly to such compositions based on diphenylmethane diisocyanate and to their use in the production of polyurethane and other macromolecular materials.

The manufacture of macromolecular materials based on organic polyisocyanates and active hydrogen containing compounds is well established. Thus, polyurethanes of various types, flexible or rigid, cellular or non-cellular, may be obtained by suitably formulating polyisocyanates and polyols, whilst the use of polyamines leads to the production of polyureas.

For most of the processes used in the production of polyurethanes and the like, it is preferred for obvious processing reasons to use components which are homogeneous liquids at room temperature. Unfortunately, one of the most commonly used polyisocyanates, 4,4'-diphenylmethane diisocyanate, is a solid at normal ambient temperatures as are its mixtures with low amounts of 2,4'-isomer. In order to overcome this problem with diphenylmethane diisocyanate (MDI), various modified forms (MDI variants) have been produced which are generally liquids at the relevant temperatures.

One of the MDI variants commonly employed is the prepolymer, that is to say a product obtained by reacting an active hydrogen compound, of high or low molecular weight, with a stoichiometric excess of MDI. In fact for some processes, prepolymers provide a more desirable balance of reactions than does MDI itself and they are therefore also useful for this reason.

Examples of prepolymers that have been produced or proposed either for their technical performance or for their liquidity, include reaction products of MDI with one or more low molecular weight glycols or with higher molecular weight polyols, for example polyether or polyester polyols. Whilst generally liquid when produced, many of these prepolymers, depending on the free MDI content and the nature of the active hydrogen compound, still exhibit a tendency to solidify due to crystallisation of the MDI, especially when stored in cold climates. Even after modest crystallisation has occured, it is generally necessary to heat the prepolymer to temperatures of about 50°-60° C. to convert it back to a homogeneous liquid. It is clearly desirable that these crystallisation problems be avoided.

In our United Kingdom Patent No. 1547807, there are described liquid prepolymer compositions comprising an MDI based prepolymer and at least 1% by weight, based on the weight of prepolymer, of a liquid halogenated paraffin that is miscible with the prepolymer and has a boiling point of at least 150° C. at atmospheric pressure. The function of the halogenated paraffin is to minimise crystallisation.

Storage stable liquid prepolymer compositions are also described in U.S. Pat. No. 4,469,616. In this case, the compositions are mixtures of an MDI based prepolymer and a non-hydroxyl flow modifier having specified physical characteristics and consisting essentially of carbon and hydrogen atoms in the form of monovalent or polyvalent hydrocarbon groups, etheric oxygen in the form of oxyalkylene groups and at least one urethane, ester, carbonate, acetal or hydrocarbyloxy group.

EP 277.331 discloses a composition comprising bitumen, a prepolymer and two plasticizers, one of the plasticizers being 2,3-dibenzyltoluene.

Unfortunately, some additives which are effective in reducing the tendency of MDI based prepolymers to crystallise have adverse effects on the physical properties of the final polymers. It has now been found that certain substituted diphenylmethane additives as hereinafter defined provide prepolymers with enhanced resistance to crystallisation without having any negative effects on the ultimate polymer properties, in particular the plasticizing effect which these additives appeared to have was absent or surprisingly low.

Accordingly, the present invention provides a bitumen-free liquid prepolymer composition comprising:

(a) from 50 to 99% by weight of an isocyanate-containing prepolymer obtained by the reaction of a stoichiometric excess of diphenylmethane diisocyanate with an organic compound containing a plurality of isocyanate-reactive groups, and (b) from 50 to 1% by weight of a substituted diphenylmethane compound which is free from ester groups, isocyanate groups and isocyanate-reactive groups and has a melting point below 25° C., a boiling point above 150° C. and a fire point above 100° C.

Any substituted diphenylmethane compound, or mixture of such compounds, having the stated characteristics may be used in the compositions of the invention. Suitable compounds may contain one or more substituents selected from alkyl, aryl, aralkyl, cycloalkyl, alkenyl or cycloalkenyl radicals. The various substituted or unsubstituted dibenzyltoluene isomers and isomer mixtures are particularly suitable, especially commercial products such as Lipinol T (available from Hüls Chemie) of which the typical properties are Molecular weight: 272
Melting point: −35° C.
Boiling point: 390° C.
Fire point: 190° C.

Any diphenylmethane diisocyanate isomer or isomer mixture may be used in making the prepolymer, the substantially pure 4,4'-isomer and its mixtures with low amounts of the 2,4'-isomer being particularly important. Uretonimine/carbodiimide modified MDI and low functionality polymeric MDI may also be used.

The organic compound containing a plurality of isocyanate-reactive groups used in making the prepolymer may be any of the active hydrogen compounds used or proposed for use in the production of prepolymers. Thus, the organic compound may be a polyol having a molecular weight of from 62 to 10,000 or a polyamine having a molecular weight of from 60 to 10,000.

Polyols on which the prepolymers can be based may have from 2 to 8 hydroxyl groups per molecule although the higher functionality polyols will tend to give rise to prepolymers having unmanageably high viscosities. In particular, polyols suitable for elastomer applications should have a functionality of 2 to 3, preferably from 2 to 2.5, more preferably from 2 to 2.3. Examples of particularly important polyols include simple glycols such as ethylene glycol, diethylene glycol, propylene glycol, dipropylene glycol, butanediol and mixtures thereof, polyether polyols such as polyoxypropylene, polyoxyethylene and (poly)oxypropylene-oxyethylene) diols and triols and polytetramethylene glycol and linear or slightly branched polyesters such as those obtained by reacting glycols, for example ethylene glycol, diethylene glycol, 1,4-butanediol, 1,5-pentanediol or 1,6-hexanediol or mixtures thereof with dicarboxylic acids, for example succinic acid, glutaric acid or adipic acid or mixtures thereof.

Polyamines on which the prepolymers can be based include low molecular weight diamines and polyoxypropylene polyamines, or mixtures thereof.

Prepolymers of particular importance because of their ease of crystallisation are those based on the poly(ethylene adipates) and poly(ethylene/tetramethylene adipates) commonly used in the production of polyurethane elastomers. These polyester polyols typically have molecular weights in the range 1,000 to 3,500.

The prepolymers may be prepared using conventional conditions for such preparations. Thus, the MDI and the isocyanate-reactive compound may be reacted together at normal or elevated temperatures, especially in the range 60°-120° C., until the reaction is substantially complete. The initial molar ratio of isocyanate-reactive groups is suitably at least about 2.5:1, for example within the range 2.7:1 to 24:1, especially within the range 4:1 to 12:1. Preferably the NCO content of the prepolymer ranges from 15-28% by weight and more preferably from 15-25% by weight.

The compositions of the invention may be prepared by mixing the substituted diphenylmethane compound with the prepolymer at such a temperature that the latter is in liquid form. Alternatively, the prepolymer may be formed in situ by reacting the MDI with the isocyanate-reactive compound in the presence of the substituted diphenylmethane compound.

It is preferred that the compositions of the invention contain from 2 to 12% by weight of the substituted diphenylmethane compound.

The liquid prepolymer compositions of the invention may be employed in the manufacture of polyurethane and polyurea materials using conventional techniques for the manufacture of such materials from prepolymers. The final products may take the form of elastomers, foams, coatings, adhesives and the like. The compositions are particularly useful in the preparation of microcellular products such as integral skin microcellular polyurethanes, useful as shoe soles.

The invention is illustrated but not limited by the following Examples.

EXAMPLE 1

The occurence of crystallisation was monitored for a polyester based isocyanate prepolymer composition having a NCO content of 19%, commercialised by ICI under the name DP 980, in the absence and in the presence of various amounts of two anticrystallisation additives:

a) a dibenzyltoluene isomer mixture commercialised by Hüls under the name Lipinol T b) (comparative): a liquid halogenated paraffin commercialised by Hüls under the name Cereclor S52

After homogenisation, the samples were sealed under $N_2$ blanket and stored at constant temperature. The rate of crystallisation was monitored at 0° C. and 10° C.

Results are reported in Table I hereafter.

TABLE I

| Temperature/°C. | Anti-crystallisation Additive | Loading (wt % per total prepolymer composition) | Observations |
|---|---|---|---|
| 0 | — | 0 | 5 days solid |
| 0 | Cereclor S52 | 2% | 1st crystal: 5 days solid: 38 days |
| | | 5% | 1st crystal: 6 days solid: 42 days |
| | | 10% | 1st crystal: 30 days still only one crystal after 42 days |
| 0 | Lipinol T | 2% | 1st crystal: 5 days solid: 38 days |
| | | 5% | 1st crystal: 5 days 20% solid: 64 days |
| | | 10% | no crystal formation after 64 days |
| 10 | — | 0 | 1st crystal: 20 days 60-80% solid: 64 days |
| 10 | Cereclor S52 | 2% | 1st crystal: 40 days |
| | | 5% | no crystals after 64 days |
| | | 10% | |
| 10 | Lipinol T | 2% | 1st crystal: 35 days |
| | | 5% | no crystals after 64 days |
| | | 10% | |

As can be seen, both additives enhanced the liquidity of DP980, both by approximately the same extent.

EXAMPLE 2

The following microcellular elastomers were prepared and evaluated for plasticization which was monitored by change in the glass transition temperature Tg of the elastomer, and change in the rubbery modulus measured at room temperature in a dynamic mechanical thermo-analyser (Polymer laboratories model II DMPA).

Elastomer (a) was prepared by reacting together, under conventional manner,—at an isocyanate index of 100—a polyester polyol blend commercialised by ICI PLC under the trade name DEGOPOL 141/00 with a polyester based isocyanate prepolymer composition of NCO content 18% commercialised by ICI PLC under the trade name PBA 2224.

Elastomer (b) was prepared in a similar way by using as isocyanate component a PBA 2224 composition comprising 10% by wt of Lipinol T.

Results are indicated in table II herebelow. The results indicate that the use of 10% Lipinol T as anticrystallisation additive in the prepolymer component did not affect the Tg and the rubbery modulus of the elastomeric end-product.

TABLE II

| Elastomer | $T_g$/°C. | Ruberry modulus at 23° C./Pa |
|---|---|---|
| Elastomer a | −36 | $6.63 \times 10^6$ |
| Elastomer b | −35 | $6.62 \times 10^6$ |

EXAMPLE 3

Elastomers were prepared from a polyol blend based on PBA 5074, a polyol commercially available from IC PLC, and from the prepolymer used in example 1 comprising different anti-crystallisation agents (10% by weight). Tg and rubbery modulus were measured.

| Anti-crystallisation agent | Tg/°C | Rubbery modulus/Pa |
| --- | --- | --- |
| — | −40 | $5.77 \times 10^6$ |
| Cereclor S 52 | −41 | $4.92 \times 10^6$ |
| TP 90B | −42 | $5.01 \times 10^6$ |
| Lipinol T | −40 | $5.29 \times 10^6$ |

We claim:

1. A bitumen-free liquid prepolymer composition comprising:
   a) from 50 to 99% by weight of an isocyanate-containing prepolymer obtained by the reaction of a stoichiometric excess of diphenylmethane diisocyanate with an organic compound containing a plurality of isocyanate-reactive groups, and
   b) from 50 to 1% by weight of a substituted diphenylmethane compound which is free from ester groups, isocyanate groups and isocyanate-reactive groups and has a melting point below 25° C., a boiling point above 150° C. and a fire point above 100° C.

2. A composition according to claim 1 wherein the substituted diphenylmethane compound is dibenzyltoluene.

3. A composition according to claim 1 wherein the diphenylmethane diisocyanate used in making the prepolymer is the 4,4'-isomer or a mixture thereof with small amounts of the 2,4'-isomer.

4. A composition according to claim 1 wherein the organic compound containing a plurality of isocyanate-reactive groups used in making the prepolymer is a polyol having a molecular weight of from 62 to 10,000 and/or a polyamine having a molecular weight of from 60 to 10,000.

5. A composition according to claim 1 wherein the organic compound containing a plurality of isocyanate-reactive groups used in making the prepolymer is a poly(ethylene adipate) or a poly(ethylene/tetramethylene adipate).

6. A composition according to claim 1 wherein the prepolymer is the product of reacting the diphenylmethane diisocyanate and the organic compound containing a plurality of isocyanate-reactive groups at an initial molar ratio of isocyanate to isocyanate-reactive groups of at least 2.5:1.

7. A composition according to claim 6 wherein the initial molar ratio of isocyanate to isocyanate-reactive groups is in the range 4:1 to 12:1.

8. A composition according to claim 1 wherein the composition contains from 2 to 12% by weight of he substituted diphenylmethane compound and the NCO value of he prepolymer ranges from 15–28% by weight.

* * * * *